May 7, 1940.  O. KNOERZER  2,199,939
IRRIGATING PIPE COUPLING
Filed May 26, 1939
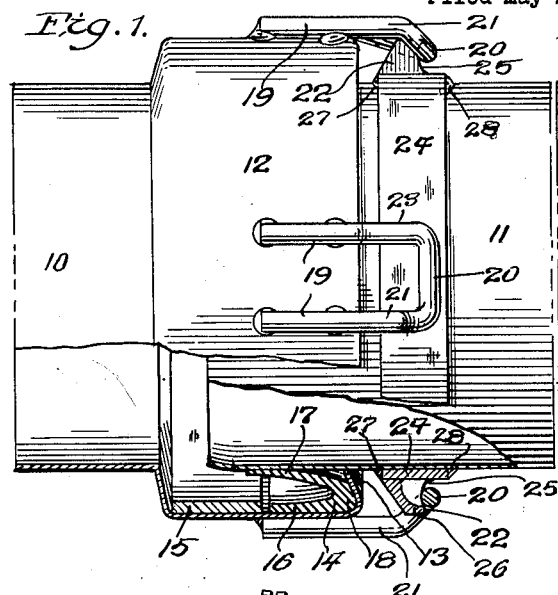
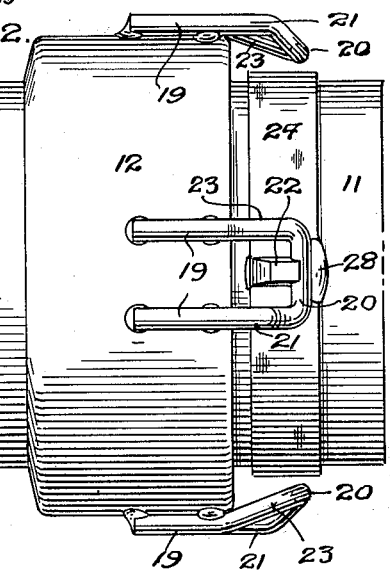
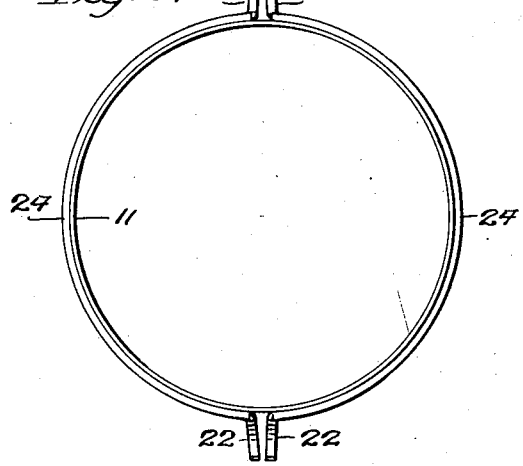
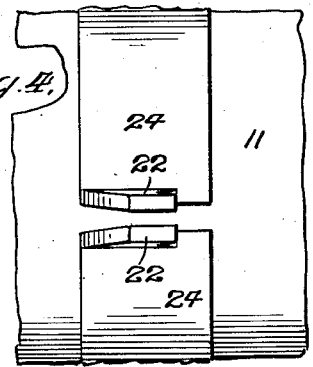
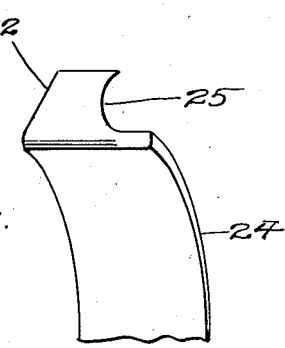
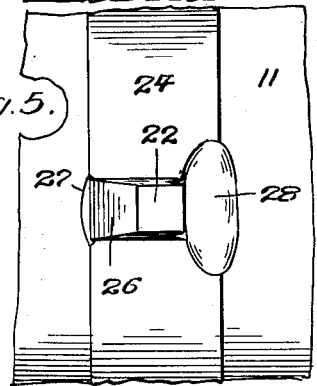
Inventor:
Otto Knoerzer,
by Charles O. Shervey
his Atty.

Patented May 7, 1940

2,199,939

UNITED STATES PATENT OFFICE 2,199,939

IRRIGATING PIPE COUPLING

Otto Knoerzer, Hammond, Ind., assignor to Champion Corporation, Hammond, Ind., a corporation of Indiana Application May 26, 1939, Serial No. 275,825

3 Claims. (Cl. 285—174)

This invention relates to irrigating pipe couplings, and is in the nature of an improvement upon the coupling shown and described in Letters Patent No. 2,066,008, dated December 29, 1936, for improvements in Irrigating pipe.

One of the objects of the present invention is to eliminate the possibility of coupling members becoming detached when adjacent pipes are laid at an angle to each other and subjected to high water pressure. This has been accomplished by forming concave eye engaging edges upon the coupling members on one pipe, engaging cooperating coupling members upon the other pipe. Another object is the provision of a hook member which is formed as a part of ring sections that are welded or otherwise rigidly secured to one of the pipes. Irrigating pipes are formed of light guage sheet metal strips, to which the hook members are fastened, and by providing the hook members upon more substantial ring sections, a very sturdy and substantial connection is provided between the hook members and the pipes.

With these and other objects and advantages in view this invention consists in the several novel features of construction, arrangement and combination of parts hereinafter fully set forth and claimed.

The invention is clearly illustrated in the drawing accompanying this specification, in which Fig. 1 is a plan of fragments of two joined irrigating pipe sections illustrating one form of the present coupling applied thereto, the view being partly broken out to illustrate the interior construction of the joint.

Fig. 2 is a plan of the parts seen in Fig. 1.

Fig. 3 is an end elevation of one of the pipe sections.

Fig. 4 is an enlarged detail plan of fragments of two ring sections, showing the same in position on a pipe section before the hook member is completed.

Fig. 5 is a view similar to Fig. 4, but showing a completed hook.

Fig. 6 is a perspective view of a fragment of one of the ring sections.

Referring to said drawing, the reference characters 10, 11 designate two irrigating pipe sections that are to be coupled together. These pipe sections are formed from light guage sheet metal strips rolled into the form of a pipe with their side edges welded together. In one form of pipe joint for irrigating pipes, each pipe section has a bell 12 welded to one end which bell has a somewhat greater diameter than the pipe proper, and the outer end of the bell wall is turned inward towards the axis of the pipe and is also turned inward toward the interior of the bell so as to provide a flaring end wall 13 for facilitating the insertion of one end of the other pipe section into the bell. Some clearance is left between the internal edge of the flange 13 and the inserted pipe end as is clearly shown in Fig. 1 to permit the pipe sections to be turned at a slight angle with respect to each other so as to accommodate the irrigating pipe to the contour of the land upon which it is laid.

To maintain a leak proof joint between the pipe sections a sealing ring 14 desirably in the form of a washer or gasket, composed of rubber or other suitable elastic material, is held in the interior of the bell between the flange 13 and a ring 15 contained within the bell and suitably fastened to its wall as by spot welding it thereto. The sealing ring is usually formed with two annular diverging lips 16, 17, that extend from an apex part 18. The lip 16 is substantially cylindrical in form and bears against the internal face of the bell wall and the lip 17 converges towards the axis of the bell and is adapted to hug the inserted end of an associated pipe section. When water under pressure is forced through the irrigating pipe, the lips of the sealing ring are forced tightly against the bell wall and inserted end of an associated pipe, thereby providing a water tight seal. Various forms of sealing rings may be employed which permit of angular adjustment between adjacent pipes and provide a leak proof joint in any of the various angular positions of the pipe sections.

The coupling means forming the subject matter of this specification will now be described. Welded or otherwise rigidly secured to the outer face of the bell wall of each pipe section is one or several coupling members, here shown in the form of U-shaped eye members 19, that project beyond the end of the bell with their U-bends 20 inclined towards the axis of the pipe. One leg 21 of each eye member extends parallel with the axis of the pipe for some distance beyond the end of the bell to provide a space through which the hereinafter mentioned hooks 22 may be turned into the openings in the eye members by turning an inserted pipe on its axis after its end has been fully inserted into the bell. The other leg 23 of each eye member inclines towards the edge of the bell and provides a stop for limiting the turning movement of a pipe section when it is being locked to an adjacent one. Four eye members are illustrated in the drawing on each bell and disposed equidistantly therearound. A lesser or greater number of eye members may be used as is desired. By locating the eye members diametrically opposite each other at least two hook members may be used on the inserted pipe for engagement with any two of the oppositely disposed eye members.

For rigidly securing the hooks to the light guage sheet metal pipe sections, the hooks are formed upon the ends of two semi-circular ring sections 24, which are welded to the pipe sections 11, adjacent the ends thereof opposite the ones containing the bells. The ring sections are suitably spaced from the pipe end to permit the latter to be inserted beyond the sealing ring. The ring sections are composed of strips of strap metal of suitable width and thickness and the hooks 22 thereof are struck up with suitable dies at the ends thereof and bent to stand approximately radially thereof and the strips are rolled into semi-circular form. The eye engaging edges of the hooks are made concave as seen at 25 whereby the transverse members of the U-bends of the eye members tend to seat themselves in the deepest parts of the concave edges whenever strain is placed upon the pipe sections tending to separate them. Furthermore by reason of the concave edges of the hooks it is practically impossible for the eye members to slip out of engagement with the hooks when the pipe sections lie at an angle to each other, and when strain is placed upon the pipe sections tending to widen the angle between them.

Two ring sections with their hook members disposed opposite each other are welded or otherwise rigidly secured to a pipe section with the hook members spaced slightly from each other. (See Figs. 3 and 4.) After the ring sections have been welded to the pipe section the two hook members of each hook are welded together with welding material 26, thereby closing the rear sides and ends of the hook members. In welding the hook members together, the ring sections are also welded to the pipe section as at 27, 28, thereby providing a very rugged connection between the hooks and the pipe sections.

With two joined pipes extending at a slight angle to each other, when water under high pressure is forced through the pipes the strain on the coupling members is intense and there is a great tendency to widen the angle between the adjacent pipes and to force them apart. With hooks containing the concave eye engaging edges, the transverse members of the eyes seat themselves on the concave edges of the hooks and cannot climb out of the concave edges. As a result the couplings hold the pipes together despite the great strain placed thereon by high water pressure.

More or less variation of the exact details of construction is possible without departing from the spirit of this invention; I desire, therefore, not to limit myself to the exact form of the construction shown and described, but intend, in the following claims to point out all of the invention disclosed herein.

I claim as new and desire to secure by Letters Patent:

1. In an irrigating pipe coupling, two pipe sections connected by a water-tight joint, a pair of oppositely disposed semi-circular ring members surrounding and welded to one pipe section adjacent the end that is joined to the other pipe section, said ring members having hook members projecting from their ends, those on one ring member being disposed opposite to those on the other ring member, the oppositely disposed hook members being welded together to provide a single integral, reinforced hook and the adjacent ends of the ring members being welded to the pipe section, and said hook members having concave edges, in combination with coupling means connected to the other pipe section and adapted to engage the concave edges of the hook members.

2. In an irrigating pipe, the combination of two pipe sections, one having a bell on one end in which an end of the other pipe section is received, an eye member rigidly secured to and projecting beyond the end of the bell and having the transverse part of its U-bend disposed adjacent said other pipe, semi-circular oppositely disposed companion ring sections welded to the other pipe section adjacent the end which is received in the bell, the adjacent ends of the ring sections having out-turned hook members formed with concave eye engaging edges, the hook members at each end of the ring sections being welded together to provide a single, integral, reinforced hook, and the ends of the ring sections being welded to the pipe section.

3. In an irrigating pipe coupling, the combination of two pipe sections, one having a bell on one end in which an end of the other pipe is received, a sealing ring in said bell contacting with the wall thereof and the inserted end of the pipe section, a plurality of eye members rigidly secured to and projecting beyond the end of the bell and each having the transverse part of its U-bend disposed adjacent said other pipe, semi-circular oppositely disposed ring sections welded to said other pipe adjacent the end which is received by the bell, the adjacent ends of the ring sections having out-turned hook members formed with concave eye engaging edges, the hook members at each end of the ring sections being welded together to provide a single integral reinforced hook, and the ends of the ring sections being welded together and to the said other pipe section.

OTTO KNOERZER.